United States Patent [19]
Cope et al.

[11] Patent Number: 5,676,717
[45] Date of Patent: Oct. 14, 1997

[54] SEPARATOR TANK

[75] Inventors: Larry H. Cope, Cooleemee; John R. Owings, Mocksville; Jerry W. Riddle, Advance, all of N.C.

[73] Assignee: Ingersoll-Rand Company, Woodcliff Lake, N.J.

[21] Appl. No.: 554,956

[22] Filed: Nov. 13, 1995

[51] Int. Cl.$^6$ ................................................ B01D 36/02
[52] U.S. Cl. ................. 55/321; 55/337; 55/419; 96/211
[58] Field of Search ................. 55/321, 337, 419; 95/268; 96/209, 211, 219, 189, 190

[56] References Cited

U.S. PATENT DOCUMENTS

| | | |
|---|---|---|
| 386,173 | 7/1888 | White . |
| 1,824,713 | 9/1931 | Fisher et al. ............ 55/337 |
| 2,087,464 | 7/1937 | Ayers . |
| 2,298,285 | 10/1942 | Flecther . |
| 2,515,202 | 7/1950 | Dyer ........................ 96/211 |
| 2,547,769 | 4/1951 | Packie et al. .............. 55/337 |
| 2,893,510 | 7/1959 | Spann ....................... 96/211 |
| 2,903,088 | 9/1959 | Spann ....................... 96/211 |
| 2,911,059 | 11/1959 | Spann ....................... 96/211 |
| 2,925,878 | 2/1960 | Spann ....................... 96/209 |
| 3,116,238 | 12/1963 | Van Etten . |
| 3,654,748 | 4/1972 | Bloom . |
| 3,853,518 | 12/1974 | Tu et al. . |
| 3,924,575 | 12/1975 | Zipay ........................ 55/337 |
| 3,997,303 | 12/1976 | Newton ..................... 95/268 |
| 4,092,137 | 5/1978 | Howe et al. . |
| 4,290,791 | 9/1981 | Matsui et al. . |
| 4,666,473 | 5/1987 | Gerdau ...................... 55/321 |
| 4,906,264 | 3/1990 | Szymaszek et al. ....... 55/337 |
| 5,049,171 | 9/1991 | Presnell et al. . |

FOREIGN PATENT DOCUMENTS

| | | | |
|---|---|---|---|
| 2204829 | 8/1973 | Germany ............... 96/209 |
| 55-36374 | 9/1980 | Japan ..................... 55/337 |
| 1101569 | 7/1984 | U.S.S.R. ................. 55/321 |
| 682131 | 11/1952 | United Kingdom ..... 55/337 |
| 935147 | 8/1963 | United Kingdom ..... 55/337 |

*Primary Examiner*—C. Scott Bushey
*Attorney, Agent, or Firm*—Michael M. Gnibus

[57] ABSTRACT

An apparatus for primary air/oil separation for an oil-flooded air compressor, the apparatus includes a tank having a sidewall, a bottom end and a top end. The sidewall and ends define a tank separation chamber. The apparatus further includes a flow conduit for flowing an air/oil mixture from the compressor into the tank separation chamber. A primary separator element is located in the chamber and provides primary separation of the air/oil mixture. The primary separator element is flow connected to the flow conduit and includes a body with at least two discharge ends and an arcuate elbow flow connected to each of the at least two discharge ends. Each elbow has an outer peripheral portion and an inner peripheral portion. As the air/oil mixture is forced through the separator element, the oil is drawn to the outer peripheral portion and the compressed air is located in the inner peripheral portion. In this way, primary separation of the oil and the air is achieved.

11 Claims, 3 Drawing Sheets

SEPARATOR TANK

FIELD OF THE INVENTION

This invention generally relates to a separator tank for an oil-flooded air compressor, and more particularly to an apparatus for primary air/oil separation in a separator tank where an air/oil mixture is flowed through a separator tube having arcuate elbow portions and the oil is separated from the air by centrifugal forces as the mixture is flowed through the arcuate portions of the tube.

DESCRIPTION OF THE PRIOR ART

In a conventional compressed air system which includes an oil-flooded compressor, a gas, typically air, is compressed in the compression chamber or "airend", and a lubricant, such as oil, is injected into the chamber and mixes with the compressed air to produce an air/oil mixture.

The compressed air and oil mixture is discharged from the compressor and is flowed, with a high velocity, into a separator tank. The mixture is flowed into the tank separation chamber, which is usually cylindrical, and is directed around the chamber walls. The combination of the centrifugal forces acting on the air/oil mixture and contact between the mixture and the chamber walls, causes much of the oil to separate from the mixture and gravity draws the oil downward away from the air and into the tank, allowing the air to separate from the oil and flow upward in the tank. This is known in the art as "primary separation".

The air, along with some oil mist, passes through a filter element also known as a separator element, coalescing most of the remaining oil before the air is delivered out of the tank. This is known in the art as "secondary separation". The coalesced oil pools in the inside bottom of the filter element, and is returned by a scavenging line to the compressor airend system at a point of lower pressure. This technique is referred to in the art as "scavenging".

Conventional methods of primary separation require that the air/oil mixture entering the separator tank be directed with a high velocity, into the separator tank. An undesirable effect of such high velocity discharge is believed to be the creation of a vortex in the separator tank. If a vortex is created, oil collected in the bottom of the tank would likely be drawn upward by the vortex and mixed with the air. It would then be difficult to separate the additional drawn oil from the air during secondary separation by the separator element. As a result, the efficiency of the separator tank would be decreased significantly and a substantial volume of oil would remain in the compressed air that is discharged from the separator.

Also, the air/oil mixture may be discharged through the inlet and into the tank chamber with such a high velocity that the mixture is not immediately drawn by gravity down into the tank reservoir but rather continues to flow around the tank and across the tank inlet, contacting the flow of air/oil entering the tank. This can cause splashing and foaming of the oil resulting in poor primary separation.

Additionally, in conventional systems, the air/oil mixture may be injected with a high velocity into the separator tank and directed upward, onto the bottom surface of the filter element. The direct impingement of the mixture with the filter increases the volume of oil that comes in contact with the filter element and is absorbed by the filter. Therefore less oil is separated in the primary separation, and it becomes necessary to separate more oil during secondary separation. However, since the required amount of oil is not separated during primary separation, not all of the oil may be separated from the air and the air that is flowed from the tank may still be mixed with an undesirable amount of oil.

In order to filter the oil from the air during secondary separation, more complex and expensive filter and scavenge designs are required.

The foregoing illustrates limitations known to exist in present devices and methods. Thus, it is apparent that it would be advantageous to provide a primary oil/air separation directed to overcoming one or more of the limitations set forth above. Accordingly, a suitable alternative is provided including features more fully disclosed hereinafter.

SUMMARY OF THE INVENTION

In one aspect of the present invention, this is accomplished by providing an air/oil separation apparatus that includes a tank having a sidewall, a bottom end and a top end. The sidewall and ends define a tank separation chamber. The apparatus further includes a flow conduit for flowing an air/oil mixture from the compressor into the tank separation chamber. A primary separator element is located in the chamber and provides primary separation of the air/oil mixture. The primary separator element is flow connected to the flow conduit and includes a body with at least two discharge ends and an arcuate elbow flow connected to each of the at least two discharge ends. Each elbow has an outer peripheral portion and an inner peripheral portion. Primary separation of the air/oil mixture is performed by the primary separator element. As the air/oil mixture is forced through the separator element, the heavier oil is drawn to the outer peripheral portion and the lighter compressed air is located in the inner peripheral portion. As the oil and air are discharged from the elbows, the oil is drawn down into the bottom of the chamber and the substantially oil-free air flows upwards towards the top end of the tank. Secondary separation is performed on the substantially oil-free air by a secondary separator element or filter that extends into the tank chamber.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
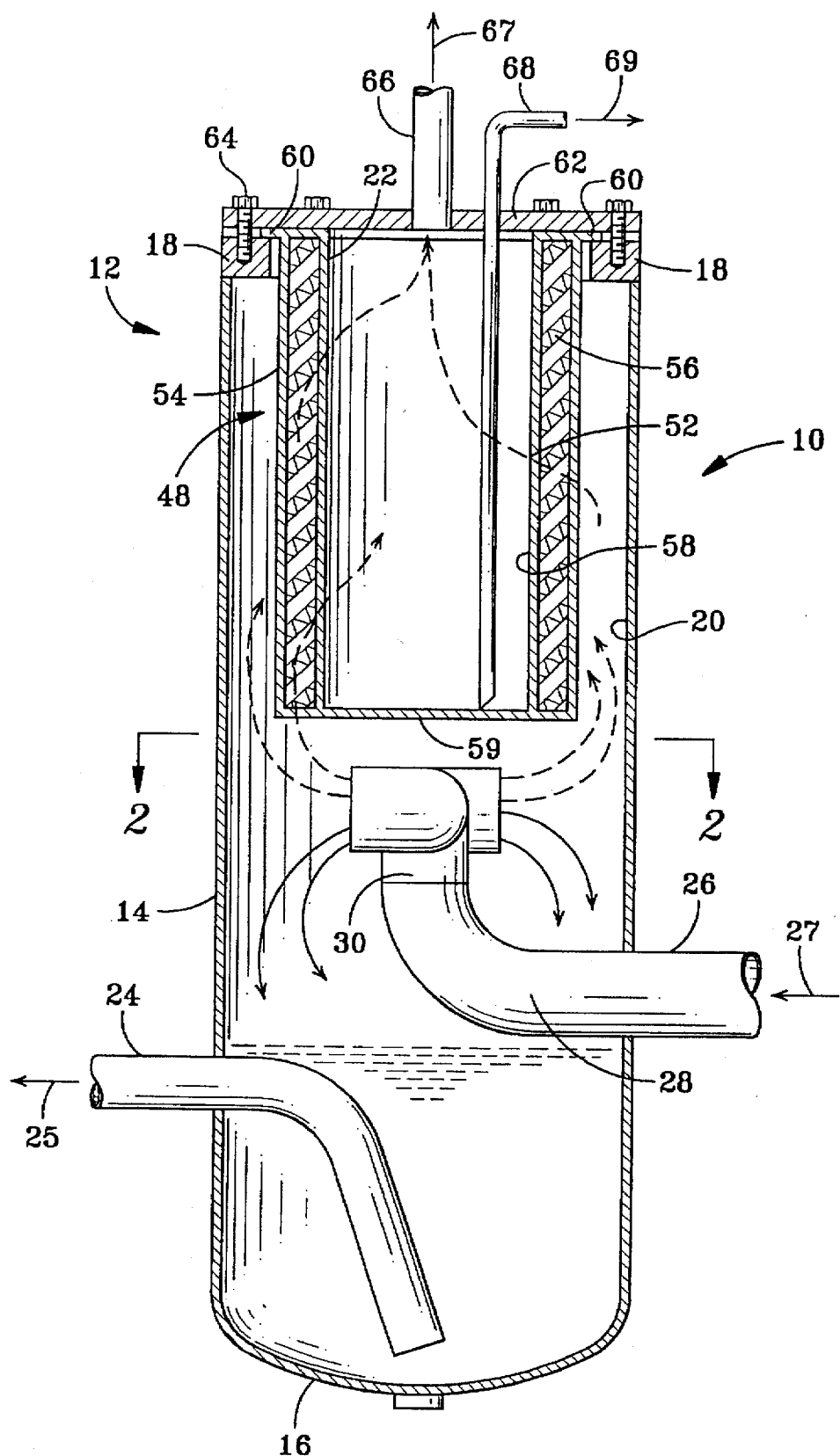
FIG. 1 is a partial longitudinal sectional view of the separator tank that includes the separator tube of the present invention.

Referring now to the drawings, wherein similar reference characters designate corresponding parts throughout the several views, FIG. 1 shows a separator generally designated at 10 for separating oil from an air/oil mixture discharged from a conventional oil-flooded air compressor. Although the separator tank 10 as disclosed is used to separate oil from air in an air/oil mixture, it is contemplated that the separator may be used to separate a volume of gas from any mixed media combination including any gas/liquid, or gas/liquid/solid mixture. However, for purposes of the description of the preferred embodiment, the mixture separated by separator tank 10 will be an air/oil mixture.

It is contemplated that the compressor may be any oil-flooded air compressor, however for the purposes of the preferred embodiment, the compressor is preferably a rotary screw compressor.

The separator 10 includes a tank 12 having a cylindrical sidewall 14 and top and bottom ends 18 and 16 respectively. The sidewall and ends define tank separation chamber 20. An opening 22 is formed in the top end 18 of tank 12.

As shown in FIG. 1, the bottom portion of the tank separation chamber 20 serves as an oil reservoir for the oil that is separated from the air/oil mixture by separator 10. An opening is provided in the bottom end of the tank 12 and one end of an oil exit conduit 24 is extended through the opening and into the oil reservoir. The oil exit conduit provides a means for flowing the oil that is collected in the reservoir back to the compression chamber (not shown) of the air compressor (not shown) in the general direction indicated by arrow 25.

An opening is provided in sidewall 14 and is adapted to receive an air/oil flow conduit 26, such as a pipe or the like, for flowing the air/oil mixture discharged from the compressor compression chamber into the separator tank chamber 20 in the general direction indicated by arrow 27. The flow conduit flow connects the compressor discharge port (not shown) with the tank separation chamber.

The flow conduit includes a first, substantially horizontal portion 28 and a second substantially vertical portion 30 that is integral with the first portion. The second portion extends away from the first portion, towards the top end 18 of the separator tank 12, as shown in FIG. 1. It is contemplated that the flow conduit second portion 30 may extend away from the first portion 28 towards the bottom end 16 of the tank 12. Additionally, it is contemplated that the flow conduit may only extend in a single linear direction, and may be comprised of a single member like first portion 28 or second portion 30. Additionally, the second portion 30 does not have to be perpendicular to the first portion 28. An angle other than 90 degrees may separate the first and second portions of the flow conduit 26.

Figure 3:
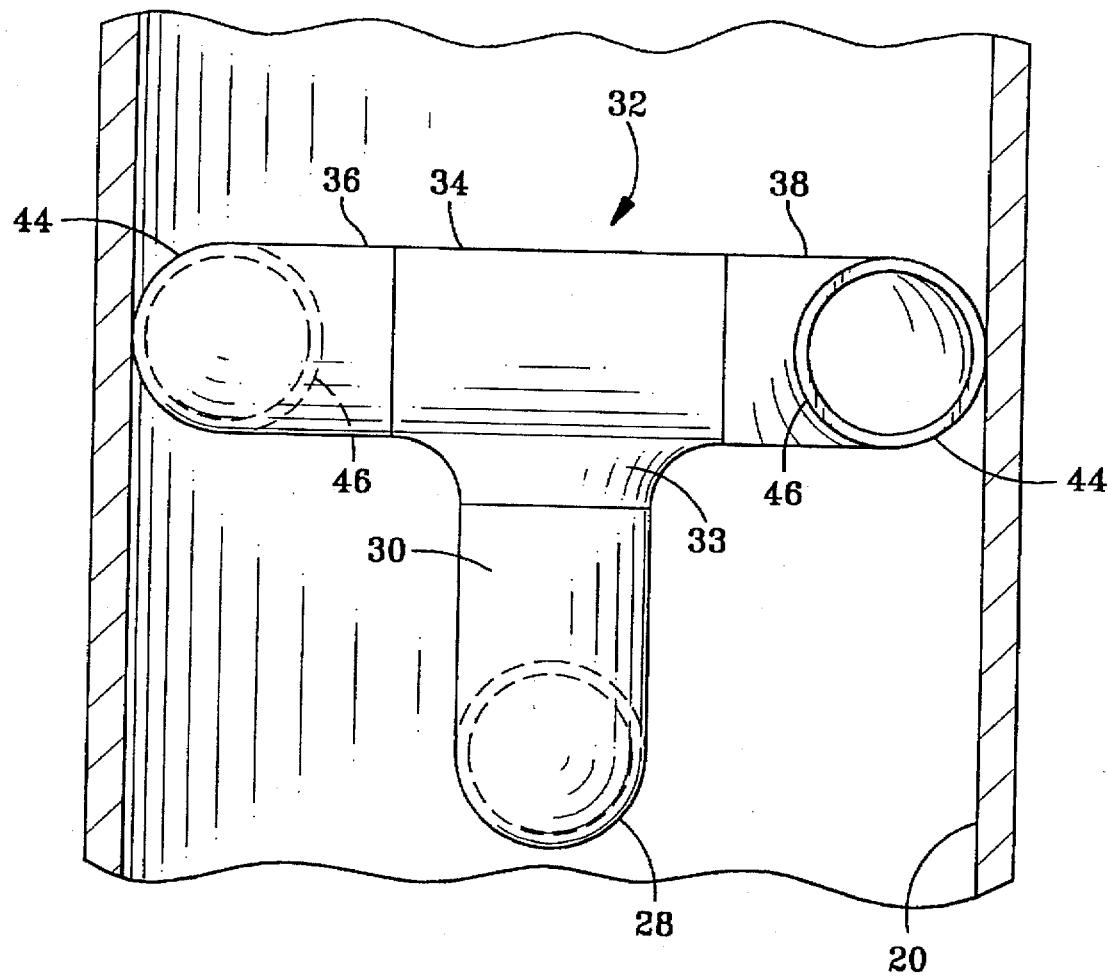
FIG. 3 is an enlarged sectional view taken along line 3—3 of FIG. 1.

Primary separator element 32 is located in chamber 20 and is connected to the flow conduit 26 at the free end of the second portion 30 of flow conduit 26, as shown in FIG. 3. The separator element 32 is flow connected to conduit 26 at primary separator inlet 33 to be in air/oil mixture receiving relation with the conduit. The primary separator element may be threadably connected to the end of the flow conduit second portion 30, or may be connected to the second portion 30 via a weld connection or another conventional connection method that is well known to one skilled in the art. Primary separation of the air/oil mixture is produced by the primary separator element.

Figure 2:
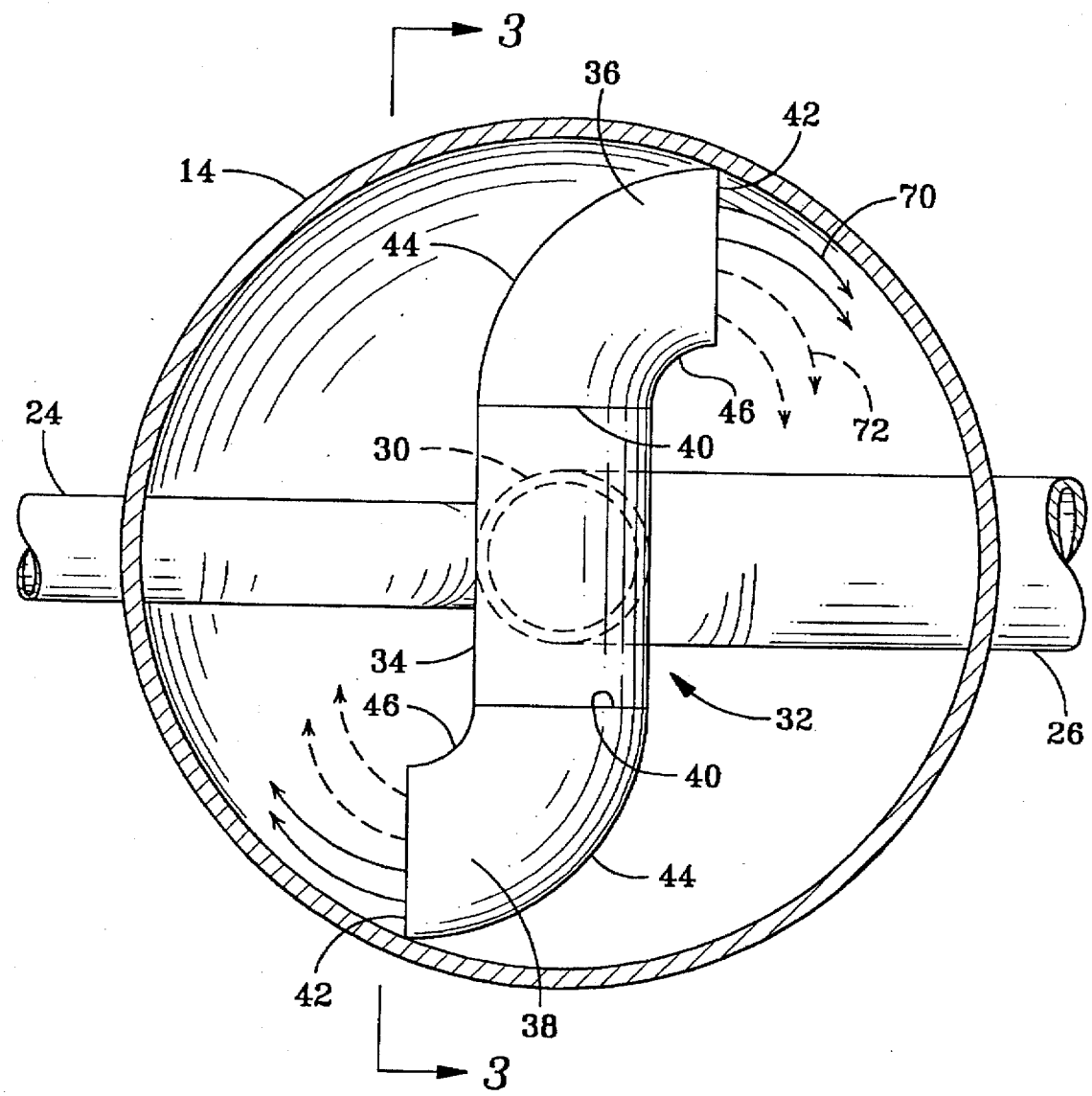
FIG. 2 is an enlarged sectional view taken along line 2—2 of FIG. 1.

The separator element 32 includes a hollow, substantially straight body 34 having a pair of discharge ends, and a pair of substantially arcuate elbows 36 and 38 that are made integral with the body at the body ends as shown in FIG. 2. The elbows are flow connected to the ends of the body in a conventional manner, for example by a threaded connection or by a weld connection. As shown in FIG. 3, the body and elbows are co-planar. It is contemplated that the body 34 and elbows may not be co-planar. The elbows may be rotated from the orientation shown in the Figures so that the discharge end 42 of each elbow is directed either substantially upward toward end 18 or substantially downward toward end 16.

In addition, although two elbows are disclosed in the preferred embodiment, it is contemplated that the separator body 34 may be altered to accommodate the flow connection of additional elbows to the separator body. For example, the separator body may be Y-shaped with three free ends, or shaped like a "+" with four free ends, with an elbow like elbows 36 and 38 connected to each free end.

The cross-section of the separator body and elbows may be circular or non-circular. However for purposes of the preferred embodiment the cross-section is circular.

The hollow elbows 36 and 38 are arcuate and are the same. Each elbow includes an inlet end 40 connected to the end of the separator body, a discharge end 42, an outer peripheral portion 44, and an inner peripheral portion 46. Each elbow is bent or otherwise formed so that the elbow inlet and elbow discharge end are normal to each other and are separated by ninety degrees. The inlet and discharge can be offset by greater or less than ninety degrees.

As shown in FIG. 2, the elbow bend radius is smaller at the inner peripheral portion 46 than the bend radius at the outer peripheral portion 44. As shown in FIG. 3, the outer peripheral portion 44 of the discharge end 42 of each of the elbows 36 and 38 is located immediately proximate the inner portion of wall 14. The outer peripheral portion of the elbows may be tangent to the inside of the sidewall 14.

The discharge ends 42 of the elbows are both oriented so that as the mixture is flowed from the elbows, the oil continues in a clockwise flow around the tank separation chamber and the compressed air flows towards the top end 18 of the tank. As shown in FIG. 2, the mixture is flowed from the elbows around the chamber in the same clockwise direction. The discharge ends of the elbows could be oriented so that the oil discharged from the elbows flows in a counterclockwise direction around the separation chamber.

The separator element 32 decreases the velocity of the air/oil mixture and, as a result, chamber vortices are eliminated. The separator tank in combination with the separator element 32 allows the oil to smoothly decelerate around the tank wall before falling down into the reservoir. The primary separator element 32 may be made from any suitable metallic or non-metallic material and may be unitary or may be comprised of discrete elbows 36 and 38 and body 34 as shown in FIG. 2.

A conventional filter element 48 is located in chamber 20, directly above separator element 32. For purposes of the disclosure, the filter shall be referred to as a secondary separator element 48. Secondary separation of the air/oil mixture discharged from elbows 36 and 38 and represented by dashed font arrows 72, is performed by the secondary separator element.

The secondary separator element 48 is of a design well known in the art and has a cylindrical body comprised of inner and outer perforate metal shells 52 and 54, and a paper filter 56 sandwiched between the metal shells. The inner shell defines an interior passage 58 whereby substantially oil-free compressed air flows from the tank chamber 20. The secondary separator element also includes a closed bottom 59 and an annular flange member 60 joined to the upper end of the secondary separator element 48. The flange may be provided with a plurality of openings which are adapted to receive bolts or other conventional fasteners.

The secondary separator element is located in the chamber 20 by passing the filter body through the opening 22 in top end 18. The flange is seated on the top end 18 as shown in FIG. 1. A cover 62 is seated on top of the flange so that the flange is sandwiched between the cover and the top end of the tank 12. The cover includes openings (not shown) like the openings in top end 18, so that when the cover is placed on the flange, bolts 64 or other conventional fasteners may be passed through the cover 62 and top end 18 to hold the separator element 48 in place during use of the separator 10. If the flange includes openings the bolts or conventional fasteners may also be passed through the openings provided in the flange.

Openings are formed in the cover 62 which are adapted to receive service air outlet member 66 and scavenging conduit 68. As shown in FIG. 1, the scavenging conduit extends through the opening in the cover, through the interior passage 58 to the bottom 59 of the separator element 48 and provides a means for scavenging oil coalesced in the element 48 back to the compressor in the general direction indicated by arrow 69. Service air outlet member 66 extends through an opening in the cover and provides a means for flowing substantially oil-free compressed air to a tool or another object of interest in the direction indicated by arrow 67.

In operation, an oil-flooded air compressor compresses a gas, typically air, in a compression chamber and during compression, a lubricant, typically oil, is injected into the compression chamber to cool the compressed air. The mixture of compressed air and oil is discharged from the compressor through flow conduit 26 and is flowed into the primary separator element 32 located in separation chamber 20 of tank 12. The mixture is flowed into the chamber under a pressure typically ranging from 70 psi to 425 psi and at a temperature typically ranging from 80° F. to 270° F.

Primary separation of the air/oil mixture occurs in the separator element 32. As the mixture enters the body of the element, a portion of the mixture volume flows towards elbow 36 and a portion of the mixture volume flows towards elbow 38. As the mixture flows through the arcuate elbow portions, centrifugal forces affect the mixture. As a result, the relatively heavier oil is drawn to the outer peripheral portion 44 of the elbows and the lighter air and a small volume of the oil remains in the inner peripheral portion 46 of the elbows. This is shown in FIGS. 1 and 2 by solid font arrows 70 which represent oil and dashed-font arrows 72 representing the mixture of air and small volume of oil or oil mist. The velocity of the mixture is decreased by the separator element 32 as the mixture flows through the element.

As the oil is discharged from the elbows near the outer periphery, the oil contacts the sidewall 14 and flows in a clockwise direction around chamber 20 and follows the contour of the cylindrical sidewall. Then, after a short period of time, the oil falls down through the force of gravity and is collected in the reservoir at the bottom of tank 12.

The compressed air mixed with a small volume of oil flows upwards towards the top end 18 of the tank and through secondary separator element 48. Secondary separation is performed by the secondary separator element. A volume of the oil in mixture 72 is coalesced from the air by the separator element. The substantially oil-free compressed air flows into the interior passage 58, and is discharged from the tank through service air outlet 66, to an object of interest.

The oil mist that is coalesced by the secondary separator element is drawn inward towards passage 58, runs down shell 52, and collects at the element bottom 59. The collected coalesced oil is drawn out of the bottom of the separator element by scavenging conduit 68, and is returned to the compressor for use by the compressor.

In this way, the oil is separated from the compressed air so that the air that is used by the object of interest is substantially oil-free.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A separator tank comprising:
   a) a tank having a sidewall, a bottom end and a top end, the sidewall and ends defining a separation chamber;
   b) conduit means for flowing a mixed media combination into the separation chamber; and
   c) primary separator means for providing primary separation of the mixed media combination, the primary separator means being flow connected to the conduit means, the primary separator means having an elongate tubular body with at least two discharge ends and an elbow flow connected to each of the at least two discharge ends, wherein each of said elbows is oriented to direct the mixed media combination in the same circumferential direction around the separation chamber.

2. The separator tank as claimed in claim 1, further including secondary separator means located in the separation chamber, the secondary separator means for providing secondary separation of the mixed media combination.

3. The separator tank as claimed in claim 1, wherein each of the elbows includes an inlet, a discharge end, an outer peripheral portion and an inner peripheral portion and wherein the body and each of the elbows has a circular cross-section.

4. The separator tank as claimed in claim 3, wherein the elbow discharge end and the inlet are offset by 90 degrees.

5. The separator tank as claimed in claim 1, wherein each of the elbows includes an inlet end, a discharge end, an outer peripheral portion having an outer bend radius, an inner peripheral portion having an inner bend radius, the discharge and inlet ends being separated by ninety degrees and the outer bend radius being larger than the inner bend radius.

6. The separator tank as claimed in claim 5, wherein the outer peripheral portion of each elbow is located proximate the sidewall.

7. The separator tank as claimed in claim 1 wherein the mixed media combination includes gaseous and non-gaseous components, and wherein the secondary separator means includes an outer shell, an inner shell, a filter medium between the shells, an annular flange at one end of the filter means adapted to be located on the top end of the tank, said inner shell defining a passage, said passage adapted to receive a scavenging line and a service line for the gaseous component of the mixed media combination.

8. The separator tank as claimed in claim 7, further comprising a cover adapted to be located on the annular flange.

9. A separator for providing primary separation of a mixed media combination comprised of gaseous and non-gaseous components, the separator including a separator tank which defines a separation chamber; a first flow conduit means that includes a discharge end located in the separation chamber, said first flow conduit means for supplying the mixed media combination into the separation chamber in a first direction; second flow conduit means having a first end flow connected to the discharge end of the first flow conduit means and a second end, said second flow conduit means for directing the mixed media combination in a second direction substantially perpendicular to the first direction; primary separation means having a tubular body with an inlet flow connected to the second end of the second flow conduit means and perpendicular thereto, said primary separation means also including at least two discharge ends and an elbow portion flow connected to each of the at least two discharge ends wherein each elbow portion includes an inlet end, a discharge end, an outer peripheral portion having an outer bend radius, an inner peripheral portion having an inner bend radius and wherein the elbow discharge ends are oriented to direct the mixed media combination in the same circumferential direction around the separation chamber, and also wherein, the non-gaseous components are drawn to the outer peripheral portion and the gaseous components are located at the inner peripheral portion as the mixed media combination is flowed through the separator.

10. The separator as claimed in claim 9 wherein the discharge and inlet ends are offset by ninety degrees and the outer bend radius being larger than the inner bend radius.

11. The separator as claimed in claim 9 wherein the tubular body and elbows are coplanar and extend across the separation chamber.

* * * * *